Patented Mar. 12, 1935

1,994,416

UNITED STATES PATENT OFFICE 1,994,416

RECOVERING IODINE

Charles W. Girvin, Long Beach, Calif., assignor to Io-Dow Chemical Company, Inc., Long Beach, Calif., a corporation of Louisiana Application April 5, 1934, Serial No. 719,091

8 Claims. (Cl. 23—217)

The present invention relates to methods of producing iodine, and has particular regard to recovering iodine from silver iodide.

A well known process for recovering iodine from natural iodiferous brines and similar solutions containing small amounts of dissolved iodides, such as certain oil field waste waters, consists essentially in treating such brine with a silver salt more soluble than silver iodide, such as silver nitrate, sulphate, chloride, etc., whereby the iodine content of the brine is precipitated as the insoluble silver iodide, as described in United States Patent No. 1,837,777. The resulting precipitate of silver iodide is separated from the aqueous solution, and is then worked up to prepare iodine or commercial iodine compounds. This invention is concerned with an improvement in the working up of such silver iodide.

The most direct method of treating the silver iodide is to chlorinate the same directly, whereby iodine is liberated, with the concurrent formation of silver chloride. There are various difficulties connected with the direct chlorination of silver iodide, however, which interfere with the smooth carrying out of the treatment. The reaction is strongly exothermic and so much heat is produced that it is difficult to prevent the mass from being heated to the point of sintering or fusion. When this occurs the physical condition of the mass is so altered that it becomes impossible for chlorine to penetrate the same, and the reaction is stopped before complete liberation of the iodine from the silver iodide takes place. Hence, the yield of iodine falls far short of the theoretical, and the separation of iodine from the fused cake is difficult. Furthermore, such fused or sintered material is not in suitable form to return to the process for precipitating iodine from more of the brine.

I have found, however, that the direct chlorination of silver iodide can be performed smoothly and with substantially complete liberation of the iodine, when the silver iodide is suspended in a liquid vehicle composed of a substance or compound substantially unreactive with chlorine under the reaction conditions. Suitable substances are liquid chlorinated aliphatic hydrocarbons, such as carbon tetrachloride, ethylene chloride, chloroform, acetylene tetrachloride, tetrachlorethylene, propylene chloride, etc., in which iodine is more or less soluble. My improved method or process, constituting the invention, is set forth in the following detailed description and annexed drawings.

Figure 1:
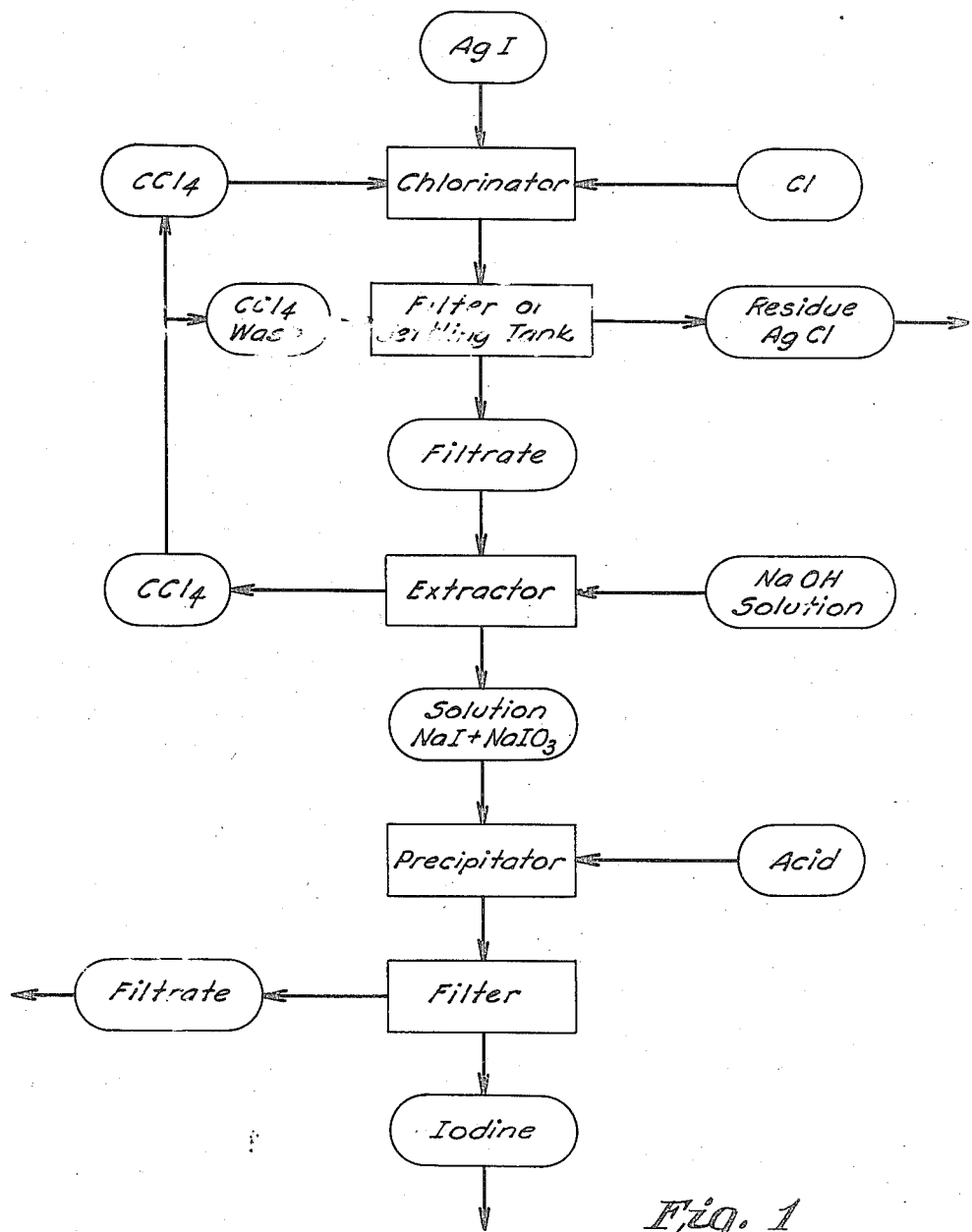
Figure 2:
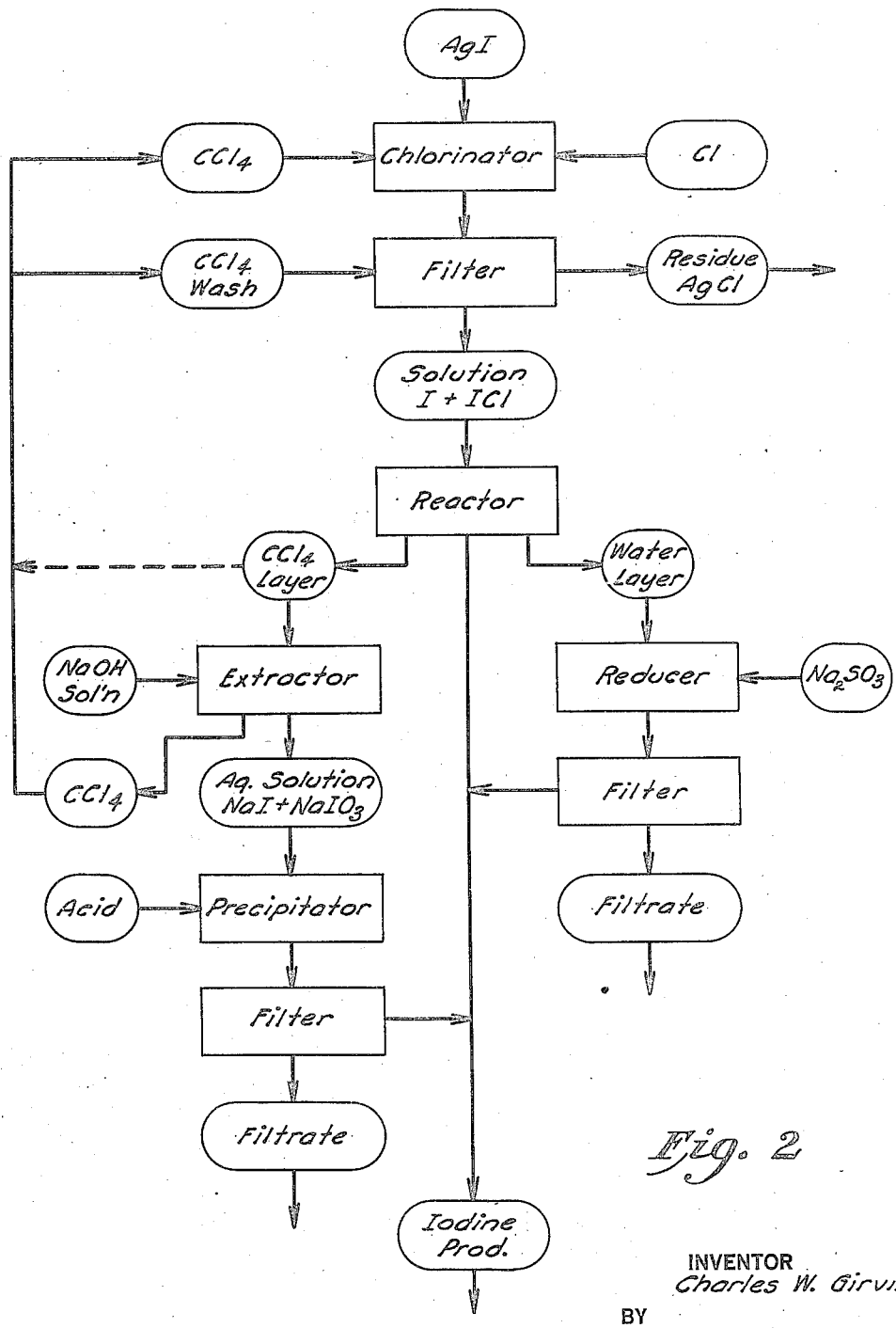

In said drawings:

Figs. 1 and 2 are flow sheets showing two modifications of the general method herein disclosed.

In carrying out my improved method the silver iodide, which has previously been dried, if necessary, is suspended in carbon tetrachloride, for example, and chlorine is introduced into the suspension to react with the silver iodide and liberate the iodine. The presence of the carbon tetrachloride, among other advantages, provides for the absorption of the heat of reaction and hence prevents the overheating and sintering of the silver iodide or silver chloride. The silver chloride produced by the reaction is in very finely divided form, and is particularly well adapted for use in treating the iodiferous brine or similar solution of an iodide to precipitate the iodide content thereof as silver iodide.

In order to effect a direct separation of iodine from the silver chloride formed in the reaction it is desirable to have the iodine in solution, so that it can be filtered from the precipitate of silver chloride. To accomplish this result a sufficient volume of carbon tetrachloride may be employed to hold in solution all of the iodine that is liberated. The solubility of iodine in carbon tetrachloride at ordinary temperature is approximately 2.5 per cent by weight, hence about 40 pounds of carbon tetrachloride per pound of iodine is required to hold all of the liberated iodine in solution. By chlorinating silver iodide suspended in such proportion of carbon tetrachloride, substantially complete liberation of the iodine may be secured, employing the theoretical quantity of chlorine required to react with the silver iodide. The carbon tetrachloride solution of iodine so prepared is filtered from the precipitate of silver chloride, and the latter washed with a small amount of carbon tetrachloride. The filtrate and washings, containing dissolved iodine, may then be extracted with an aqueous alkali solution, such as an alkali metal hydroxide or carbonate, which combines with the iodine to form a solution of alkali iodide and iodate. The aqueous solution is then separated from the carbon tetrachloride, the latter being returned to the process for use in the chlorination of an additional amount of silver iodide. The aqueous iodide-iodate solution may then be acidified, whereupon the iodine is precipitated, and may be separated from the aqueous solution and further purified in known manner to make a commercially pure product.

Fig. 1 of the drawings shows diagrammatically the course of the materials in process according to the procedure just described. In the chlorinator silver iodide suspended in carbon tetrachloride is reacted with a chemically equivalent amount of chlorine, sufficient carbon tetrachloride being used to dissolve all of the liberated iodine. The reacted mixture is transferred to a filter or settling tank where the precipitate of silver chloride is separated from the carbon tetrachloride solution of iodine, and washed with an additional amount of carbon tetrachloride. The filtrate and washings are treated with an aqueous sodium hydroxide solution in the extractor, whereby the iodine is extracted from the carbon tetrachloride. The two immiscible liquids are then separated, the carbon tetrachloride being recycled for use in the chlorinating and washing steps. The aqueous solution of sodium iodide and iodate is then treated with an acid, e. g. hydrochloric acid or sulphuric acid, in the precipitator, whereby the iodine is precipitated, after which it is separated from the filtrate, forming the immediate iodine product from the process.

By an alternative procedure a smaller proportion of carbon tetrachloride may be used, if an excess of chlorine is employed for chlorinating the silver iodide. The excess of chlorine reacts with the liberated iodine to form iodine chloride, ICl, which is freely soluble in carbon tetrachloride. The solution of iodine chloride in carbon tetrachloride also will dissolve free iodine, so that the excess of chlorine used need not be sufficient to combine with all of the iodine liberated. It is only necessary to use a large enough excess of chlorine to dissolve all of the liberated iodine, either as such or as iodine chloride, in the volume of carbon tetrachloride employed. The proportions of excess chlorine and of carbon tetrachloride naturally may be varied widely. As already described, if the proportion of carbon tetrachloride to iodine is about 40/1 by weight, no excess of chlorine is required to hold the iodine in solution, but if the proportion of carbon tetrachloride is less than that mentioned a corresponding excess of chlorine will be required to dissolve up all the liberated iodine as a result of the formation of iodine chloride. For example, if the proportion of carbon tetrachloride to iodine is about 4/1 by weight, an excess of about 50 percent over the chemical equivalent of chlorine is sufficient to produce a solution in which all of the iodine will be dissolved as such or as iodine chloride. If a larger amount of carbon tetrachloride is used, a smaller excess of chlorine will suffice, and conversely a larger excess of chlorine will be required if a smaller amount of carbon tetrachloride is used.

The solution of carbon tetrachloride, iodine chloride and iodine so obtained is filtered to separate the precipitate of silver chloride, and the latter washed with a little carbon tetrachloride. The filtrate and washings are then treated with water by thoroughly intermixing therewith, so as to decompose iodine chloride according to the equation;

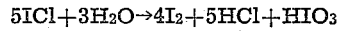

$$5ICl + 3H_2O \rightarrow 4I_2 + 5HCl + HIO_3$$

After the treatment the water layer, which contains the iodic acid, $HIO_3$, separates from the carbon tetrachloride layer, while most of the iodine is precipitated as solid, although the carbon tetrachloride layer is, of course, saturated with iodine. The solid iodine is separated from the liquid layers, and the two liquid layers are separated from each other. From the carbon tetrachloride layer iodine is recovered by extraction with an aqueous alkali solution in the manner hereinbefore described. The aqueous layer is treated with a reducing agent, e. g. an alkali sulphite or thiosulphate, to reduce the iodic acid to free iodine, which is filtered off and added to the main body of iodine.

The sequence of steps in the foregoing treatment is shown in Fig. 2. The silver iodide is suspended in a smaller amount of carbon tetrachloride than alone is capable of dissolving all of the liberated iodine, e. g. about 10 parts of $CCl_4$ to 1 part of iodine by weight, and is then chlorinated, using a sufficient excess of chlorine to effect complete solution of the iodine, cooling, if necessary, to prevent loss of solvent by vaporization. The reaction product is filtered to separate the solid residue of silver chloride from the solution, and the precipitate washed with carbon tetrachloride. The filtrate, consisting of iodine and iodine chloride in carbon tetrachloride, is then shaken with water in a reactor to decompose the iodine chloride into iodine and iodic acid, as already shown. When the treatment is complete the mixture separates into two liquid layers and a precipitate of solid iodine. The iodine is filtered off, and the two liquid layers are worked up separately to recover the iodine values therefrom. The water layer containing the iodic acid in solution is treated with a reducing agent, e. g. sodium sulphite, to reduce the iodic acid to iodine, which precipitates and is filtered off and added to the main body of the iodine product. The carbon tetrachloride layer is treated in an extractor with an alkali solution, e. g. sodium hydroxide, to extract the iodine. The carbon tetrachloride is then separated and recycled to the chlorination step. The aqueous solution of sodium iodide and sodium iodate is then acidified to precipitate iodine therefrom, which is filtered off and added to the main body of the iodine product.

The advantage of the last described mode of operation is that it requires only a small part of the inventory of carbon tetrachloride in process that the first described procedure requires. Since the carbon tetrachloride layer separated from the water layer in the procedure of Fig. 2 contains only a relatively small amount of iodine, it may be recycled directly to the chlorination step without being worked up to recover its iodine content, as shown by the dotted line in Fig. 2.

In similar manner, iodine may be recovered from silver iodide by chlorinating the latter suspended in any other suitable chlorinated aliphatic hydrocarbon, such as those hereinbefore mentioned. By carrying out the chlorination at temperatures below the boiling point of the chlorinated hydrocarbon, or in general below about 100° C., no material chlorination of the liquid takes place.

In the commercial process for producing iodine from oil field waste waters by the precipitation as silver iodide, the precipitate actually obtained contains various impurities, especially organic matter, which it is necessary to remove in order to avoid disturbances and losses in the subsequent steps of working up the precipitate for the preparation of pure iodine. Such organic matter may advantageously be destroyed by roasting the crude silver iodide precipitate in admixture with sodium nitrate and sodium chloride, as more particularly described in the copending application of S. B. Heath et al., Serial No. 711,222, filed February 14, 1934.

The roasted cake obtained by such treatment, which is composed principally of a mixture of silver iodide, sodium carbonate and sodium chloride, may be worked up advantageously according to the method of the present invention as hereinbefore described, the alkali metal salts being unaffected by the chlorination treatment and being removed from the process along with the silver chloride.

As already mentioned, the silver chloride residue produced is in a finely divided form which is very reactive and can be used with great advantage for the direct treatment of iodiferous brines and solutions to precipitate silver iodide therefrom. The presence of soluble alkali salts in the silver chloride residue from the present process has no effect upon the reactivity of the silver chloride itself, when the latter is used for treating brine, such salts, of course, being normally soluble in the brine.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of treating silver iodide, the step which consists in chlorinating the silver iodide while suspended in a liquid medium consisting of a chlorinated aliphatic hydrocarbon non-reactive with chlorine at temperatures below the boiling point of the chlorinated hydrocarbon.

2. In a method of treating silver iodide, the steps which consist in suspending the silver iodide in a liquid chlorinated aliphatic hydrocarbon non-reactive with chlorine at temperatures below the boiling point of the chlorinated hydrocarbon, introducing chlorine to liberate iodine from the silver iodide, and separating the liberated iodine.

3. In a method of treating silver iodide, the step which consists in chlorinating the silver iodide while suspended in a medium of carbon tetrachloride.

4. In a method of treating silver iodide, the steps which consist in suspending the silver iodide in carbon tetrachloride, adding chlorine to liberate iodine from the silver iodide and separating the liberated iodine.

5. The method of treating silver iodide which comprises suspending the silver iodide in carbon tetrachloride, adding chlorine to liberate iodine from the silver iodide, whereby a solution of iodine and a precipitate of silver chloride is formed, separating the precipitate, and recovering iodine from the solution.

6. The method of treating silver iodide which comprises suspending the silver iodide in carbon tetrachloride, adding chlorine to liberate iodine from the silver iodide, whereby a solution of iodine and a precipitate of silver chloride is formed, separating the precipitate, extracting iodine from the solution with an aqueous alkali and recovering iodine from combination with the alkali.

7. The method of treating silver iodide which comprises suspending the silver iodide in a smaller volume of carbon tetrachloride than is required to dissolve all of the iodine subsequently formed, adding chlorine in sufficient excess to liberate the iodine from the silver iodide and to dissolve all of such iodine, separating the precipitate of silver chloride thereby formed from the solution of iodine and iodine chloride, and treating such solution to recover iodine therefrom.

8. The method of treating silver iodide which comprises suspending the silver iodide in a smaller volume of carbon tetrachloride than is required to dissolve all of the iodine subsequently formed, adding chlorine in sufficient excess to liberate the iodine from the silver iodide and to dissolve all of such iodine, separating the precipitate of silver chloride thereby formed from the solution of iodine and iodine chloride, treating such solution with water, whereby most of the iodine is precipitated, separating such precipitate and recovering residual iodine from the carbon tetrachloride and water solutions.

CHARLES W. GIRVIN.